United States Patent
Lohr

(10) Patent No.: US 9,722,441 B2
(45) Date of Patent: Aug. 1, 2017

(54) HAND TOOL BATTERY INCLUDING A BRIDGE RECTIFIER

(71) Applicant: Robert Bosch GmbH, Stuttgart (DE)

(72) Inventor: Guenter Lohr, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 131 days.

(21) Appl. No.: 14/315,929

(22) Filed: Jun. 26, 2014

(65) Prior Publication Data
US 2015/0002081 A1    Jan. 1, 2015

(30) Foreign Application Priority Data

Jun. 28, 2013 (DE) .......... 10 2013 212 731
Aug. 9, 2013 (DE) .......... 10 2013 215 820

(51) Int. Cl.
*H02J 7/00* (2006.01)
*H02M 7/219* (2006.01)

(52) U.S. Cl.
CPC .......... *H02J 7/0052* (2013.01); *H02M 7/219* (2013.01); *H02J 7/0042* (2013.01); *H02J 2007/0059* (2013.01); *H02M 2007/2195* (2013.01); *Y02B 70/1408* (2013.01)

(58) Field of Classification Search
CPC .............. H05B 37/0272; G01J 1/0247; H04L 2012/2841; H01F 38/14; H02J 4/00; H02J 5/005; H02J 7/025; H02J 7/0052; H02J 2007/0059; H02J 7/0042; H02M 7/219; H02M 2007/2195

USPC ........................................................ 320/108
See application file for complete search history.

(56) References Cited

U.S. PATENT DOCUMENTS

| | | | | |
|---|---|---|---|---|
| 7,218,535 B2* | 5/2007 | Tsuruya | ................. | H02M 1/34 363/127 |
| 8,519,666 B2* | 8/2013 | Terao | ..................... | H02J 7/025 320/108 |
| 8,760,293 B2* | 6/2014 | Steiner | ................... | G01J 1/02 250/205 |
| 8,855,554 B2* | 10/2014 | Cook | ..................... | H02J 5/005 307/104 |
| 8,947,041 B2* | 2/2015 | Cook | .................. | G06K 7/0008 307/104 |
| 2006/0013022 A1* | 1/2006 | Jitaru | ..................... | H02M 1/38 363/21.12 |
| 2010/0148723 A1* | 6/2010 | Cook | .................. | G06K 7/0008 320/108 |
| 2013/0010018 A1* | 1/2013 | Economy | .......... | H05B 37/0272 345/691 |
| 2014/0029311 A1* | 1/2014 | Lu | .......................... | H02M 3/24 363/16 |
| 2014/0159656 A1* | 6/2014 | Riehl | ..................... | H01F 38/14 320/108 |
| 2014/0184150 A1* | 7/2014 | Walley | ................... | H02J 5/005 320/108 |
| 2014/0277805 A1* | 9/2014 | Browne, Jr. | ............. | H02J 4/00 700/295 |

(Continued)

*Primary Examiner* — Helen Rossoshek
(74) *Attorney, Agent, or Firm* — Norton Rose Fulbright US LLP; Gerard Messina

(57) ABSTRACT

A hand tool battery includes a charging coil and a bridge rectifier. The bridge rectifier has at least two rectifying arrangements for synchronous rectification.

9 Claims, 3 Drawing Sheets

(56) References Cited

U.S. PATENT DOCUMENTS

2015/0349573 A1* 12/2015 Tschirhart ................. H02J 7/04
          320/108
2016/0020643 A1* 1/2016 Abe ........................ H02J 7/025
          320/108

* cited by examiner

HAND TOOL BATTERY INCLUDING A BRIDGE RECTIFIER

RELATED APPLICATION INFORMATION

The present application claims priority to and the benefit of German patent application no. 10 2013 212 731.6, which was filed in Germany on Jun. 28, 2013, and German patent application no. 10 2013 215 820.3, which was filed in Germany on Aug. 9, 2013, the disclosures of both of which are incorporated herein by reference.

FIELD OF THE INVENTION

The present invention is directed to a hand tool battery including a charging coil and a bridge rectifier.

BACKGROUND INFORMATION

A hand tool battery including a charging coil and a bridge rectifier is believed to be understood.

SUMMARY OF THE INVENTION

The bridge rectifier has at least two rectifying arrangements for synchronous rectification. A "charging coil" is to be understood in particular as a coil which receives inductively transmitted energy during a charging process for charging battery cells of the hand tool battery. The charging coil may receive the energy from an inductive charging device which is configured separately from the hand tool battery. A "bridge rectifier" is to be understood in particular as a circuit which is provided to convert energy delivered by the charging coil as AC voltage into a DC voltage. The bridge rectifier may have four rectifying arrangements. Each rectifying arrangement may be situated operatively between a terminal of the charging coil and one of two DC voltage potentials of the bridge rectifier, so that each terminal of the charging coil is connected operatively to each of the DC voltage potentials via one of the rectifying arrangement.

"Provided" is to be understood in particular to mean specifically electrically conductively connected, programmed, configured, and/or specifically equipped. "An object is provided for a specific function" is to be understood in particular to mean that the object fulfills and/or carries out this specific function in at least one application and/or operating state. A "rectifying arrangement" is to be understood in particular as an arrangement which is provided to transmit energy from one of the terminals of the charging coil to one of the DC voltage potentials. The rectifying arrangement may be configured as a transistor for synchronous rectification. Alternatively, the rectifying arrangement for synchronous rectification could be configured as another arrangement which appears reasonable to those skilled in the art, but which may be, however, as an operational amplifier and/or as a relay. In particular, the rectifying arrangement is configured as a power transistor. In particular, the rectifying arrangement is provided to conduct direct currents greater than 2 amperes, advantageously greater than 5 amperes, particularly advantageously greater than 10 amperes. The rectifying arrangement is advantageously configured as a p-channel MOSFET or as an n-channel MOSFET. For example, the rectifying arrangement could be configured as an Si7617DN transistor or as an Si7686DP transistor.

Alternatively, the rectifying arrangement could be configured as another transistor which appears reasonable to those skilled in the art. In addition, the bridge rectifier advantageously has additional, in particular two additional non-synchronous rectifying arrangement which may be configured as diodes. "Synchronous rectification" is to be understood in particular as rectification in which at least the two rectifying arrangements are switched at least essentially simultaneously with a change of a potential between the two terminals of the charging coil. The embodiment according to the present invention of the hand tool battery makes it possible to achieve particularly low losses and thus advantageously low heat generation during an inductive charging process. In addition, a discharge of the battery cells by the bridge rectifier may be prevented, in particular via leakage currents of Schottky diodes of a passive bridge rectifier.

In one additional embodiment, it is provided that the bridge rectifier has a shut-off device which is provided to switch the at least two rectifying arrangements simultaneously to a passive state at least during a no-load operation, which are in particular connected to a same DC voltage potential and/or are provided for synchronous rectification, whereby particularly low losses and therefore advantageously low heat generation during the no-load operation may be achieved. As a result, the battery cells of the hand tool battery have an advantageously low temperature when removing the hand tool battery from the inductive charging device, whereby the hand tool battery may be promptly advantageously charged. A "shut-off device" is to be understood in particular as a device which is provided to decrease energy consumption in at least one operating state by deactivating at least one arrangement of the hand tool battery. During a no-load operation, the shut-off device may reduce energy consumption of a control device which is provided to control the rectifying arrangement. The shut-off device in particular prevents a loss of power which is applied for controlling the rectifying arrangement during a rectifying operation.

A "no-load operation" is to be understood in particular as an operating state in which the hand tool battery is inductively coupled to the inductive charging device, and no substantial energy is transmitted from the inductive charging device to the hand tool battery, for example, because the battery cells of the hand tool battery are completely charged. In particular, a control unit of the hand tool battery communicates with the inductive charging device during the no-load operation by influencing the inductive coupling between the charging coil and the inductive charging device during the no-load operation. The expression "simultaneously switch to a passive state" is to be understood in particular to mean that the control device leaves a conductivity of the rectifying arrangement unchanged during a no-load operation. In particular, rectification of the energy of the charging coil is carried out via body diodes of the rectifying arrangement and/or via a passive rectifying arrangement situated in parallel with the synchronous rectifying arrangement.

In addition, it is provided that a same DC voltage potential is present at one power terminal of each of the two rectifying arrangements, thus making particularly effective rectification possible. A "power terminal" is to be understood in particular as an interface of a component which is provided to transmit electric power from the coil to the battery cells. The power terminal is advantageously provided to be electrically conductively connected to another component of the hand power tool, in particular a printed circuit board. Alternatively, the power terminal could be provided to connect two functional units within one integrated component. "A same DC voltage potential is present" is to be understood in particular to mean that the two terminals of the rectifying arrangement are conductively connected with the aid of a conductor, in particular a printed circuit board, resulting in the terminals having an essentially equal voltage.

Furthermore, it is provided that the bridge rectifier includes a control arrangement which generates control signals of the rectifying arrangement, whereby the rectifying arrangement may advantageously be controlled with low-resistance. A "control arrangement" is to be understood in particular as an arrangement which is provided to control another arrangement, in particular one of the rectifying arrangement. In particular, the control arrangement generates a control signal of the rectifying arrangement. The control arrangement may be configured as an arrangement which appears reasonable to those skilled in the art, but advantageously as an operational amplifier, as a relay, as an IC provided for this purpose, and/or particularly advantageously as a transistor. The control arrangement may be configured as a small-signal transistor. In particular, the small-signal transistor has an input capacitance ($C_{iss}$) which is less than 1000 pF, advantageously less than 500 pF, particularly advantageously less than 200 pF. The control arrangement may be configured as a MOSFET, in particular as a p-channel MOSFET or as an re-channel MOSFET. Alternatively, the control arrangement could be configured as another transistor which appears reasonable to those skilled in the art. The control arrangement may each be configured as a discrete component.

Alternatively, the control arrangement could be an integral part of a common integrated component or of each single integrated component. A "control signal" is to be understood in particular as a signal which is present at a control terminal of a rectifying arrangement and the modification of which changes a resistance between two power terminals of the rectifying arrangement in at least one operating state. A "control terminal of a rectifying arrangement" is to be understood in particular as a gate terminal of a (MOS)FET or a base terminal of a bipolar transistor. "Power terminals of a rectifying arrangement" is to be understood in particular as a drain terminal and/or a source terminal of a (MOS)FET or a collector terminal and/or an emitter terminal of a bipolar transistor.

In addition, it is provided that the control arrangement adjusts the control signals to a switch-off voltage at least during the no-load operation, whereby particularly low losses during the no-load operation may be achieved. A "switch-off voltage" is to be understood in particular as a voltage being present at the control terminal of the rectifying arrangement which is suitable for switching a path between the two power terminals of the rectifying arrangement to high resistance.

In addition, it is provided that the bridge rectifier has at least one voltage limitation device which limits maximum values of control signals of the rectifying arrangement during a rectifying operation; therefore, an overloading of the rectifying arrangement may be advantageously prevented. A "maximum value of a control signal" is to be understood in particular as a maximum voltage present between the control terminal and one of the power terminals of the rectifying arrangement. A "rectifying operation" is to be understood in particular as an active operating state of the bridge rectifier. The term "limit" is to be understood in particular to mean that the voltage limitation device prevents a presence of a voltage which is higher than the maximum value.

In one advantageous embodiment of the present invention, it is provided that the voltage limitation device includes at least one voltage reference arrangement, thus making possible a voltage limitation device having a particularly simple configuration. A "voltage reference arrangement" is to be understood in particular as an arrangement which provides a reference voltage. The voltage reference arrangement advantageously causes a reference voltage in at least one operating state which is at least essentially independent of a current flowing through the voltage reference arrangement, at least in one operation. The voltage reference arrangement is configured as a voltage reference arrangement which appears reasonable to those skilled in the art, but advantageously as an integrated component (for example, TL431) or particularly advantageously as a Zener diode. A "Zener diode" is to be understood in particular as a diode which is provided to allow a substantial current to pass when a provided voltage which is present in the blocking direction of the diode reaches a certain level, in particular, due to the Zener effect and/or the avalanche breakdown.

In another embodiment, it is provided that the shut-off device has at least one switch-off transistor which influences at least the control arrangement as a function of a switch-off signal, whereby a no-load operation may be set up by way of a simple configuration. A "switch-off transistor" is to be understood in particular as a transistor which is provided to influence a generation of at least the control signal via the control arrangement, so that these control arrangements output a switch-off voltage as a control signal. A "switch-off signal" is to be understood in particular as an electrical signal which interrupts a synchronous rectification by the bridge rectifier in at least one operating state, for example, when the hand tool battery is completely charged. The control unit of the hand tool battery may generate the switch-off signal.

In addition, it is provided that the bridge rectifier includes a control circuit which is provided to control the rectifying arrangement as a function of its switching voltage, thus making possible a control which has a simple configuration. The control circuit may be at least partially configured as an integrated component. A "switching voltage" is to be understood in particular as a voltage which is present between the two power terminals of the rectifying arrangement. In particular, the control circuit switches one of the rectifying arrangement through if a polarity of the switching voltage changes. The expression "control as a function of a switching voltage" is to be understood in particular to mean that the control circuit measures a voltage between the power terminals of the rectifying arrangement and controls the control terminal of this rectifying arrangement as a function of the measured voltage.

The hand tool battery according to the present invention is not to be limited to the above-described applications and specific embodiments. In particular, to fulfill one of the functions described here, the hand tool battery according to the present invention may have a number of individual elements, components, and units which deviates from a number mentioned herein.

Additional advantages result from the following description of the drawings. The drawings depict two exemplary embodiments of the present invention. The drawings, the description, and the claims contain many features in combination. Those skilled in the art will also advantageously consider the features individually and combine them into reasonable additional combinations.

DETAILED DESCRIPTION

Figure 1:
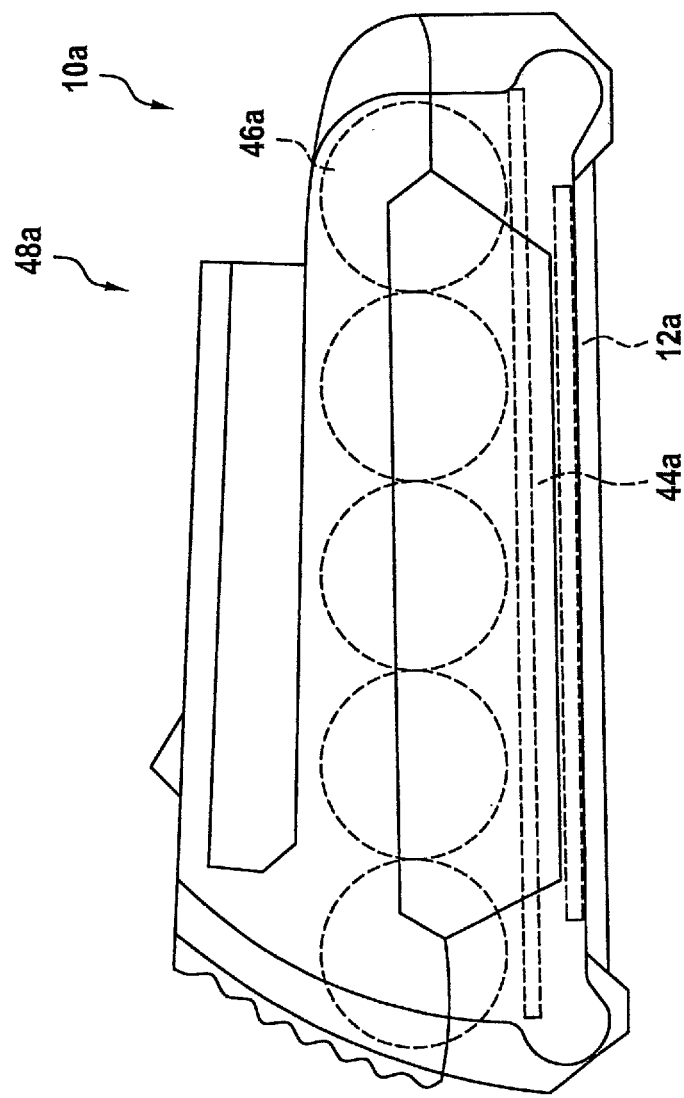
FIG. 1 shows a hand tool battery according to the present invention including a charging coil and a bridge rectifier.

FIG. 1 shows a hand tool battery 10a according to the present invention including a charging coil 12a, an electronic system 44a, battery cells 46a, and a hand power tool interface 48a. Hand power tool interface 48a, which is connected to a hand power tool which is not shown in detail, is provided for transmitting energy from battery cells 46a to the hand power tool. Battery cells 46a are configured as lithium-based battery cells. Electronic system 44a includes at least one printed circuit board and components contacted by the printed circuit board. The components form at least one bridge rectifier 14a and one control unit of hand tool battery 10a. Charging coil 12a is provided to receive energy transmitted by an inductive charging device with the aid of an alternating magnetic field and to output it to bridge rectifier 14a with the aid of an AC voltage.

Figure 2:
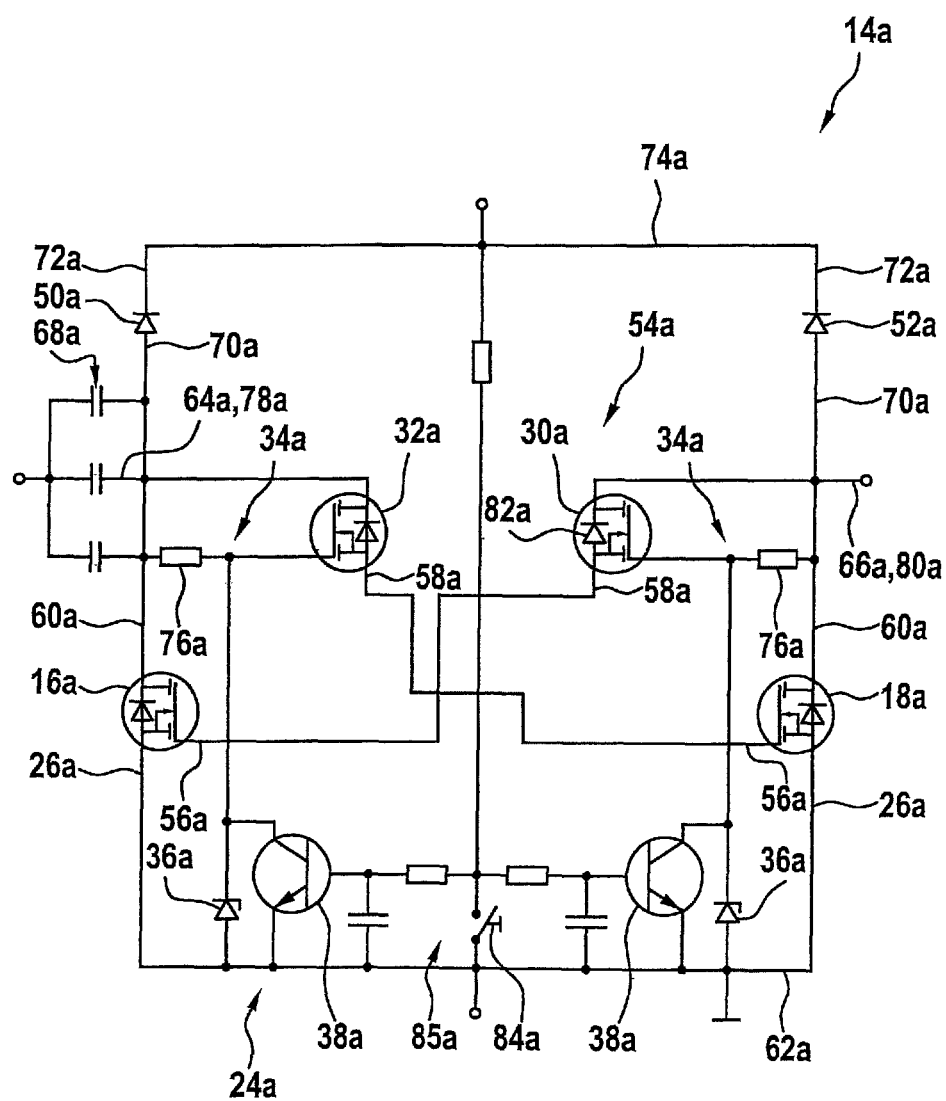
FIG. 2 shows a circuit diagram of a first exemplary embodiment of the bridge rectifier from FIG. 1.

FIG. 2 shows bridge rectifier 14a of hand tool battery 10a. Bridge rectifier 14a has two controllable rectifying arrangements 16a, 18a, two passive rectifying arrangements 50a, 52a, a shut-off device 24a, two voltage limitation devices 34a, and a control device 54a.

A first one of rectifying arrangement 16a and a second one of rectifying arrangement 18a are provided for synchronous rectification. First rectifying arrangement 16a and second rectifying arrangement 18a are configured as n-channel MOSFETs. First rectifying arrangement 16a and second rectifying arrangement 18a each have a control terminal 56a, here, a gate terminal, and two power terminals 26a, 60a, here, a drain terminal and a source terminal. An identical negative DC voltage potential 62a, here, essentially a negative battery voltage potential of battery cells 46a, is present at each first one of power terminals 26a of rectifying arrangements 16a, 18a, here, the source terminal. Each second one of power terminals 60a of rectifying arrangements 16a, 18a, here, the drain terminals, is connected to a terminal 64a, 66a of charging coil 12a. For this purpose, charging coil 12a has coupling capacitors 68a.

A third one of rectifying arrangement 50a and a fourth one of rectifying arrangement 52a are configured as diodes, advantageously as Schottky diodes. Third rectifying arrangement 50a and fourth rectifying arrangement 52a each have two power terminals 70a, 72a. One of power terminals 70a is connected to one of terminals 64a, 66a of charging coil 12a. Each other one of power terminals 72a is connected to a positive DC voltage potential 74a relative to negative DC voltage potential 62a, here, essentially to a positive battery voltage potential of battery cells 46a.

Control device 54a is provided to control first rectifying arrangement 16a and second rectifying arrangement 18a. Control device 54a controls first rectifying arrangement 16a and second rectifying arrangement 18a each as a function of a voltage which is applied to each other one of the two rectifying arrangements 16a, 18a at one of power terminals 60a. Control device 54a has a first control arrangement 30a and a second control arrangement 32a. First control arrangement 30a controls first rectifying arrangement 16a as a function of a voltage of charging coil 12a present at second rectifying arrangement 18a. Second control arrangement 32a controls second rectifying arrangement 18a as a function of a voltage of charging coil 12a present at first rectifying arrangement 16a. Control arrangements 30a, 32a are provided to control first rectifying arrangement 16a and second rectifying arrangement 18a as a function of signals of shut-off device 24a and voltage limitation device 34a. For this purpose, shut-off device 24a and voltage limitation device 34a are each connected to a control terminal 58a of control arrangements 30a, 32a.

Control device 54a limits a maximum voltage present at control terminals 56a of rectifying arrangements 16a, 18a, as a function of voltage limitation device 34a. Voltage limitation device 34a has two voltage reference arrangement 36a and two load resistors 76a. Voltage reference arrangement 36a is configured as Zener diodes. Voltage reference arrangement 36a has a reference voltage, i.e., here, a Zener voltage, which is at a maximum gate-source voltage of rectifying arrangements 16a, 18a, here, 12 volts. Load resistors 76a have a resistance at least in the kilohm range, advantageously in the megohm range. Load resistors 76a are, as shown in FIG. 2, each connected to one of terminals 64a, 66a of charging coil 12a and one of voltage reference arrangement 36a. Control terminals 56a of control arrangements 30a, 32a are controlled using a voltage which is present between load resistors 76a and one of voltage reference arrangement 36a, i.e., a voltage having a voltage profile of the voltage present at the charging coil, a maximum value being limited to the Zener voltage.

During a rectifying operation, at one point in time, a positive voltage 78a is present at a first one of terminals 64a of charging coil 12a, and a negative voltage 80a is present at a second one of terminals 66a of charging coil 12a.

During a rectifying operation, third rectifying arrangement 50a and fourth rectifying arrangement 52a are conductive as soon as positive voltage 78a of terminals 64a, 66a of charging coil 12a is present at them.

First rectifying arrangement 16a, at which positive voltage 78a is present at this point in time, is switched to high resistance by control device 54a. Negative voltage 80a is essentially present at control terminal 56a of first rectifying arrangement 16a, since a body diode 82a of first control arrangement 30a, which controls first rectifying arrangement 16a, discharges control terminal 56a of first rectifying arrangement 16a.

Second controllable rectifying arrangement 18a, at which negative voltage 80a is present, is switched to the conductive state by control device 54a. The reference voltage of one of voltage reference arrangement 36a is essentially present at control terminal 56a of second rectifying arrangement 18a, which is conductive at this point in time, since a second one of control arrangement 32a, which controls the second rectifying arrangement 18a, which is conductive at this point in time, switches through positive voltage 80a until control terminal 56a of this rectifying arrangement 18a is essentially charged up to the Zener voltage of voltage reference arrangement 36a.

Shut-off device 24a is provided to interrupt a synchronous rectification of the energy of charging coil 12a. For this purpose, shut-off device 24a blocks first rectifying arrangement 16a and second rectifying arrangement 18a simultaneously during a no-load operation in that shut-off device 24a switches first rectifying arrangement 16a and second rectifying arrangement 18a simultaneously to high resistance. For this purpose, control arrangements 30a, 32a adjust control signals of first rectifying arrangement 16a and second rectifying arrangement 18a simultaneously to a switch-off voltage. For this purpose, shut-off device 24a has switch-off transistors 38a. Switch-off transistors 38a are provided for short-circuiting voltage reference arrangement 36a as a function of a switch-off signal. As a result, a maximum voltage present at control terminals 56a of controllable rectifying arrangements 16a, 18a is reduced to ground potential. A switching arrangement 84a of the control unit controls switch-off transistors 38a with the aid of a voltage divider 85a.

Figure 3:
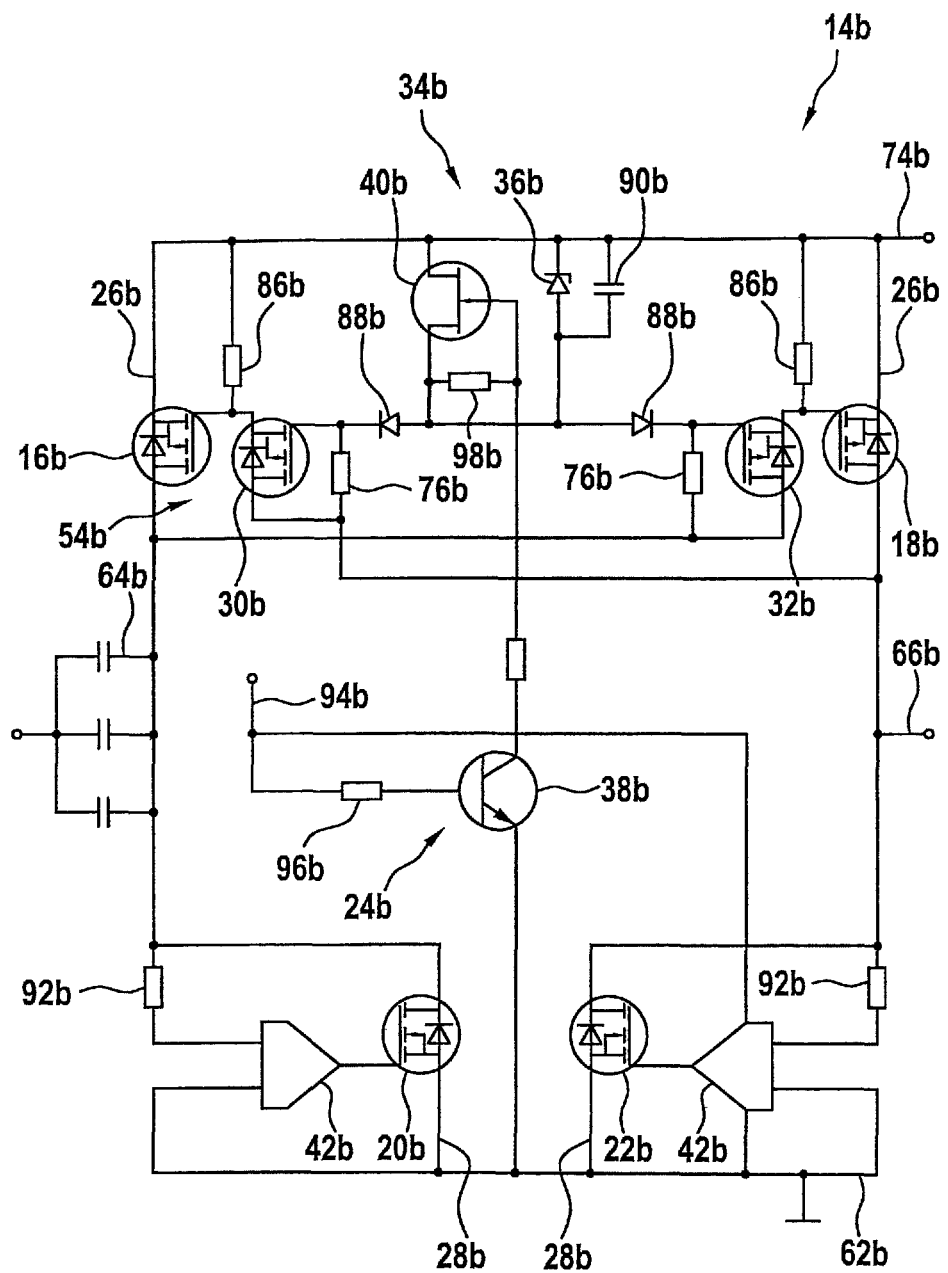
FIG. 3 shows a circuit diagram of a second exemplary embodiment of the bridge rectifier from FIG. 1.

FIG. 3 shows one additional exemplary embodiment of the present invention. The following description and the drawing are essentially limited to the differences between the exemplary embodiments, it also being generally possible to reference the drawings and/or the description of the other exemplary embodiment of FIGS. 1 and 2 with respect to identically designated components, in particular with respect to components having identical reference numerals. To differentiate the exemplary embodiments, the letter "a" follows the reference numerals of the exemplary embodiment in FIGS. 1 and 2. In the exemplary embodiment of FIG. 3, the letter "a" is replaced by the letter "b".

FIG. 3 shows a bridge rectifier 14b of a hand tool battery. Bridge rectifier 14b has four rectifying arrangements 16b, 18b, 20b, 22b for synchronous rectification. In addition, bridge rectifier 14b has a shut-off device 24b and a voltage limitation device 34b and a control circuit 42b.

Bridge rectifier 14b is provided to convert energy in the form of an AC voltage which is present between terminals 64b, 66b of a charging coil of the hand tool battery into energy in the form of a DC voltage having a negative DC voltage potential 62b and a positive DC voltage potential 74b. Negative DC voltage potential 62b essentially corresponds to a negative voltage of battery cells of the hand tool battery and forms a ground of an electronic system of the hand tool battery. Positive DC voltage potential 74b essentially corresponds to a positive voltage of the battery cells of the hand tool battery.

A first one of rectifying arrangement 16b and a second one of rectifying arrangement 18b are configured as p-channel MOSFETs. First rectifying arrangement 16b and second rectifying arrangement 18b are situated between terminals 64b, 66b of a charging coil of the hand tool battery and positive DC voltage potential 74b. Therefore, the same positive DC voltage potential 74b is present at each of power terminals 26b of first rectifying arrangement 16b and second rectifying arrangement 18b. A control device 54b of bridge rectifier 14b has two control arrangements 30b, 32b which are configured as p-channel MOSFETs.

By using p-channel MOSFETs in this exemplary embodiment, the circuit configuration of a negative branch of bridge rectifier 14a of the exemplary embodiment of FIGS. 1 and 2 may be transmitted to a positive branch of bridge rectifier 14b of the exemplary embodiment of FIG. 3.

In addition, control device 54b has two load resistors 86b which are provided to load the two control arrangements 30b, 32b if they are switched to the conductive state at control arrangements 30b, 32b. As a result, an advantageous protection from electromagnetic disturbances may be achieved. The two load resistors 86b of control device 54b have a high resistance, here, 100 kΩ.

Voltage limitation device 34b includes a single voltage reference arrangement 36b, two diodes 88b, two load resistors 76b, and a filter capacitor 90b. Voltage reference arrangement 36b is configured as a Zener diode. During a rectifying operation, a current, which has a negative potential at this point in time of the rectifying operation, flows from positive DC voltage potential 74b to terminal 64b, 66b of the charging coil via voltage reference arrangement 36b, one of diodes 88b, and one of load resistors 76b. As a result, a reference voltage drops at voltage reference arrangement 36b. The reference voltage forms a control signal of control arrangements 30b, 32b which switches through rectifying arrangements 16b, 18b, at which the positive potential of terminals 64b, 66b of the charging coil is present. Load resistors 76b have a very high resistance, here, 10 MΩ. Filter capacitor 90b smoothes a voltage which is present between voltage reference arrangement 36b and the two diodes 88b.

A third one of rectifying arrangement 20b and a fourth one of rectifying arrangement 22b are configured as n-channel MOSFETs. Third rectifying arrangement 20b and fourth rectifying arrangement 22b are situated between terminals 64b, 66b of the charging coil and negative DC voltage potential 62b. Therefore, the same negative DC voltage potential 62b is present at each of power terminals 28b of third rectifying arrangement 20b and fourth rectifying arrangement 22b. Control circuit 42b is provided to measure voltages between terminals 64b, 66b of the charging coil and negative DC voltage potential 62b. For this purpose, each control circuit 42b is connected to terminals 64b, 66b of charging coil via a coupling resistor 92b. In addition, control circuit 42b is connected to negative DC voltage potential 62b. Control circuit 42b is configured as an integrated circuit, here, as a type TEA1795T circuit.

Shut-off device 24b is provided to switch the four rectifying arrangements 16b, 18b, 20b, 22b simultaneously to a passive state during a no-load operation. For this purpose, shut-off device 24b has at least a first switch-off transistor 38b and a second switch-off transistor 40b.

A voltage output 94b of a control unit of the hand tool battery supplies control circuit 42b with an operating voltage during the rectifying operation. If voltage output 94b switches off the operating voltage during a no-load operation, control circuit 42b blocks third and fourth rectifying arrangements 20b, 22b.

Voltage output 94b of the control unit of the hand tool battery controls first switch-off transistor 38b. For this purpose, shut-off device 24b includes a coupling resistor 96b which has a high resistance, here, 1 MΩ. During the rectifying operation, first switch-off transistor 38b pulls a control signal of second switch-off transistor 40b essentially to the negative DC voltage potential 62b.

Second switch-off transistor 40b is configured as an n-channel JFET. Second switch-off transistor 40b is connected in parallel to voltage reference arrangement 36b of voltage limitation device 34b. If a control signal of second switch-off transistor 40b essentially has negative DC voltage potential 62b, second switch-off transistor 40b is blocked. Therefore, voltage limitation device 34b may operate during a rectifying operation as described above.

Shut-off device 24b includes a coupling resistor 98b which is situated between a gate terminal and a drain terminal or source terminal of second switch-off transistor 40b. Second switch-off transistor 40b is conductive if a voltage lower than approximately 2 volts arises via coupling resistor 98b. Second switch-off transistor 40b bridges voltage reference arrangement 36b if it is conductive and thus reduces a maximum value of control signals of first rectifying arrangement 16b and second rectifying arrangement 18b to the extent that they only rectify non-synchronously.

What is claimed is:

1. A hand tool battery, comprising:
    a charging coil; and
    a bridge rectifier, wherein the bridge rectifier has at least two rectifying arrangements for synchronous rectification,
    wherein the bridge rectifier has a shut-off device to switch the at least two rectifying arrangements simultaneously to a passive state at least during a no-load operation.

2. The hand tool battery of claim 1, wherein a same DC voltage potential is present at one power terminal of each of the two rectifying arrangements.

3. The hand tool battery of claim 1, wherein the bridge rectifier includes a control arrangement to generate control signals of the rectifying arrangement.

4. The hand tool battery of claim 3, wherein the control arrangement is configured to adjust the control signals to a switch-off voltage at least during the no-load operation.

5. The hand tool battery of claim 1, wherein the bridge rectifier has at least one voltage limitation device which limits maximum values of control signals of the rectifying arrangement during a rectifying operation.

6. The hand tool battery of claim 5, wherein the voltage limitation device includes at least one voltage reference arrangement.

7. The hand tool battery of claim 1, wherein the shut-off device has at least one switch-off transistor to influence at least the control arrangement as a function of a switch-off signal.

8. The hand tool battery of claim 1, wherein the bridge rectifier includes a control circuit to control the rectifying arrangement as a function of its switching voltage.

9. A circuit, comprising:
   a charging coil; and
   a bridge rectifier having at least two rectifying arrangements for synchronous rectification
   wherein the bridge rectifier has a shut-off device to switch the at least two rectifying arrangements simultaneously to a passive state at least during a no-load operation.

* * * * *